(12) United States Patent
Subat et al.

(10) Patent No.: US 9,845,059 B2
(45) Date of Patent: Dec. 19, 2017

(54) ACOUSTIC ENCLOSURE FOR MOTOR VEHICLE

(71) Applicant: Bose Corporation, Framington, MA (US)

(72) Inventors: Bradford Kyle Subat, Northborough, MA (US); Tobe Z. Barksdale, Bolton, MA (US); Charles E. Dunn, Jr., Boylston, MA (US); Lee Prager, Berlin, MA (US); Ben J. Feng, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 263 days.

(21) Appl. No.: 14/708,653

(22) Filed: May 11, 2015

(65) Prior Publication Data

US 2016/0332583 A1    Nov. 17, 2016

(51) Int. Cl.
*B29C 44/18*    (2006.01)
*B60R 11/02*    (2006.01)
*H04R 1/28*    (2006.01)
*B29K 75/00*    (2006.01)
*B29L 31/30*    (2006.01)
*H04R 1/26*    (2006.01)

(52) U.S. Cl.
CPC .......... *B60R 11/0217* (2013.01); *B29C 44/18* (2013.01); *H04R 1/2811* (2013.01); *B29K 2075/00* (2013.01); *B29K 2995/0002* (2013.01); *B29L 2031/30* (2013.01); *H04R 1/26* (2013.01); *H04R 1/2834* (2013.01); *H04R 2201/029* (2013.01); *H04R 2499/13* (2013.01)

(58) Field of Classification Search
CPC ...... H04R 1/00; H04R 2201/00; B29C 31/00; B29C 44/12
See application file for complete search history.

(56) References Cited

U.S. PATENT DOCUMENTS

| | | | |
|---|---|---|---|
| 1,566,903 | A | 12/1925 | Durst |
| 3,651,180 | A | 3/1972 | Glueckert |
| 3,720,285 | A | 3/1973 | Russell et al. |
| 3,891,022 | A | 6/1975 | Cola |
| 4,010,821 | A | 3/1977 | Quillmann |

(Continued)

FOREIGN PATENT DOCUMENTS

| | | | | |
|---|---|---|---|---|
| EP | 0581482 | A1 | 7/1993 | |
| EP | 0581482 | A1 * | 2/1994 | ......... B29C 45/1704 |

*Primary Examiner* — Christina A Johnson
*Assistant Examiner* — Kelsey C Grace
(74) *Attorney, Agent, or Firm* — Brian M. Dingman; Dingman IP Law, PC

(57) ABSTRACT

A method of creating in situ an acoustic enclosure in a space that is between body panels of a motor vehicle, wherein the space defines an empty volume, the method comprising placing into the space between body panels a molding tool that comprises a solid barrier that divides the space between body panels into an interior portion on an inside of the molding tool and an exterior portion that is external to an outside of the molding tool, where the outside of the molding tool is exposed to the space between body panels, and while the molding tool is in the space between the panels, introducing a fluid material into the exterior portion of the space between the body panels, wherein the fluid material is configured to cure into a solid shell.

24 Claims, 5 Drawing Sheets

(56) References Cited

U.S. PATENT DOCUMENTS

| | | | |
|---|---|---|---|
| 4,161,995 A | | 7/1979 | Pohlmann et al. |
| 5,232,654 A | | 8/1993 | Aida et al. |
| 5,527,414 A | * | 6/1996 | Dublinski ............... B29C 33/38 156/245 |
| 5,781,642 A | * | 7/1998 | Tanaka .................... H04R 3/14 381/345 |
| 5,858,295 A | | 1/1999 | McDowell |
| 6,071,591 A | * | 6/2000 | Dausch ................. B29C 33/505 264/278 |
| 6,502,821 B2 | * | 1/2003 | Schneider ............. B60J 5/0418 296/146.6 |
| 7,096,995 B2 | | 8/2006 | Cox et al. |
| 8,739,921 B1 | | 6/2014 | Larson |
| 8,776,944 B2 | | 7/2014 | Ito et al. |
| 8,807,982 B2 | | 8/2014 | Knox |
| 8,857,559 B2 | | 10/2014 | Reviel |
| 2002/0024233 A1 | * | 2/2002 | Kleino .................... B29C 44/18 296/146.6 |
| 2002/0070481 A1 | * | 6/2002 | Hernandez .............. B29C 33/34 264/313 |
| 2003/0075837 A1 | | 4/2003 | Sayer |
| 2014/0341391 A1 | | 11/2014 | Schuster |
| 2015/0063621 A1 | | 3/2015 | Lilley, Jr. |

* cited by examiner

ACOUSTIC ENCLOSURE FOR MOTOR VEHICLE

BACKGROUND

This disclosure relates to an acoustic enclosure for a motor vehicle.

Bass boxes for motor vehicle sound systems require a large space that is either in, or acoustically coupled to, the vehicle cabin. Space is at a premium in vehicle cabins, making it difficult to site the bass box.

SUMMARY

All examples and features mentioned below can be combined in any technically possible way.

In one aspect, a method of creating in situ an acoustic enclosure in a space that is between body panels of a motor vehicle, wherein the space defines an empty volume, includes placing into the space between body panels a molding tool that comprises a solid barrier that divides the space between body panels into an interior portion on an inside of the molding tool and an exterior portion that is external to an outside of the molding tool, where the outside of the molding tool is exposed to the space between body panels, and while the molding tool is in the space between the body panels, introducing a fluid material into the exterior portion of the space between the body panels, wherein the fluid material is configured to cure into a solid shell. Also included is a product made by this method.

Embodiments may include one of the following features, or any combination thereof. The shell may surround all of the molding tool that is in the space between body panels. The motor vehicle may have a vehicle cabin, and the interior portion of the space between body panels may be in fluid communication with the vehicle cabin. The body panels may comprise interior and exterior front quarter panels. There may be an opening in the interior panel that is in fluid communication with the vehicle cabin (when the vehicle assembly has been completed), wherein the molding tool is placed into the space between body panels through the opening in the interior panel. The fluid material may be introduced directly into the exterior portion of the space between body panels. The fluid material may be introduced into the exterior portion of the space between body panels through the interior portion of the space between body panels.

Embodiments may include one of the following features, or any combination thereof. The molding tool may comprise a soft polymer. The molding tool may further comprise a plurality of stiffening members embedded in the soft polymer. The molding tool may be expandable, and may be adapted to be expanded from a first state where the molding tool occupies a first volume, to an expanded state where the molding tool occupies a second volume that is greater than the first volume, and wherein the second volume is less than the empty volume of the space between body panels. The method may further comprise expanding the molding tool from the first state to the expanded state before the introduction of the fluid material. The molding tool may be expanded with a fluid, or it may be expanded mechanically. The fluid material may comprise an expandable foam, which may be a closed-cell foam or an open-celled foam. The shell may be air tight. The shell may comprise an external skin and/or an internal skin. One or both such skins may be air impervious.

Embodiments may include one of the following features, or any combination thereof. The method may further comprise placing a skin over the outside of the molding tool before the molding tool is placed into the space between the body panels. The skin may be on the inside of the shell. The skin may be air impervious. The fluid material may comprise an expandable open-celled or closed-cell foam. The skin may be on the outside and/or the inside of the shell. The skin may be expandable or not. The fluid material may be introduced between the skin and the outside of the molding tool. The molding tool may comprise an expandable skin.

Embodiments may include one of the following features, or any combination thereof. The method may further comprise providing a mechanical stop located between the molding tool and one or more of the body panels, where the stop at least in part defines the expanded state of the molding tool. The stop may comprise one or more standoffs on the outside of the molding tool, where the standoffs are configured to contact one or more of the body panels when the molding tool is in the expanded state.

Embodiments may include one of the following features, or any combination thereof. The molding tool may be contracted before it is placed into the space between body panels. The interior of the shell may define an acoustic volume that is constructed and arranged to be located directly to the rear of a loudspeaker. The acoustic volume may have no location with a cross-sectional area of less than about 4000 mm². The acoustic volume may be from about 4 liters to about 12 liters.

In another aspect, an acoustic enclosure for a motor vehicle with a vehicle cabin includes inner and outer panels of a motor vehicle, where the panels are spaced apart, at least in part, to define a space between the body panels, a solid, air-impervious shell in the space between the body panels, where the shell defines an interior volume on the inside of the shell, and a loudspeaker mounted such that its front is fluidly coupled to the vehicle cabin and its rear is fluidly coupled to the interior volume of the shell. The shell may comprise a closed-cell foam material. The shell may fill essentially the entire space between the body panels, except for the interior volume of the shell.

DETAILED DESCRIPTION

An acoustic enclosure (e.g., the rear cavity of a bass box) for a motor vehicle sound system can be created in situ in an available volume that is not normally used for any other purpose, and that is (or is capable of being) acoustically coupled to the cabin. Examples of such volumes include the space between the panels of the vehicle front quarter panels (also sometimes called front fenders), under a seat, in the transmission tunnel, beneath the rear deck or in the rear hatch. The acoustic enclosure can be created with a molding tool that is placed into the volume. The molding tool may be expandable or not. If the molding tool is expandable it can be placed into the volume in a collapsed state, then expanded. A flowable material that will harden in place is then placed into the volume on the outside of the tool, so as to cover the tool. When the material hardens, the tool is withdrawn from the volume. If the tool is expandable it is typically but not necessarily collapsed before it is removed. This leaves a shell that can be used as an acoustic enclosure, for example as the rear cavity of a bass box.

Figure 1A:
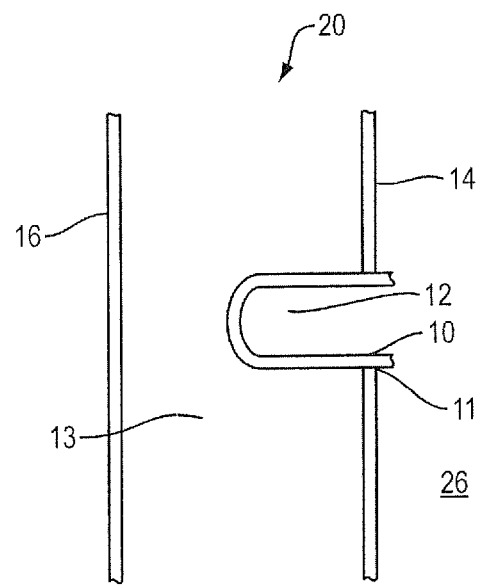
FIG. 1A is schematic cross-sectional view of an expandable molding tool in the space between two body panels of a motor vehicle.
Figure 1B:
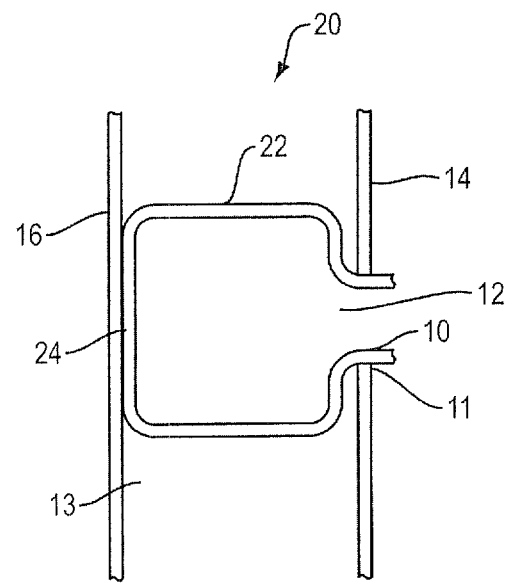
FIG. 1B shows the tool of FIG. 1A in an expanded state.
Figure 1C:
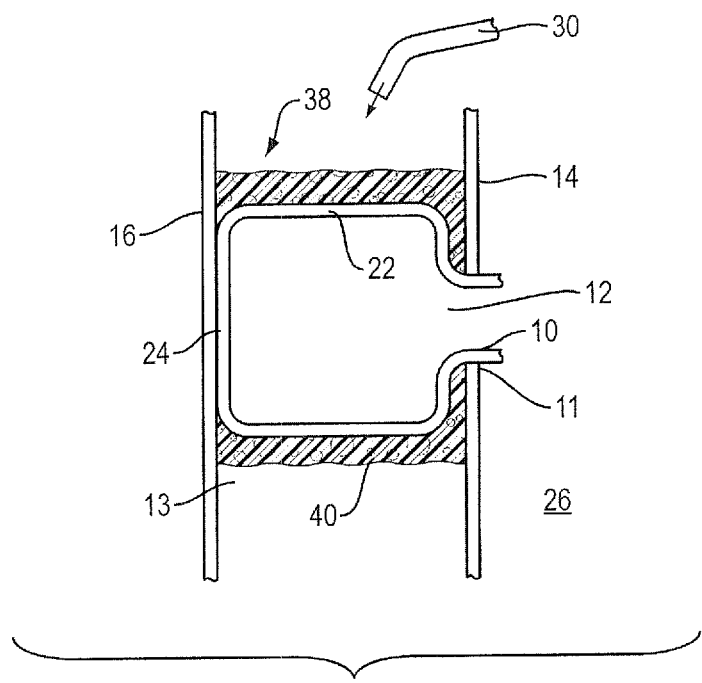
FIG. 1C shows a shell formed around the outside of the expanded tool shown in FIG. 1B.

FIGS. 1A, 1B and 1C schematically depict a method of creating in situ an air tight acoustic enclosure in the space that is between body panels of a motor vehicle. Expandable molding tool 10 is placed into space or volume 20 that is located between spaced portions 14 and 16 of a motor vehicle. In non-limiting examples described herein, portions 14 and 16 are body panels of a motor vehicle. One specific non-limiting example of body panels are the panels that make up or are part of a front quarter panel (or, front fender) of a passenger car. The front quarter panels are generally directly in front of the front driver and passenger doors, and generally extend over the adjacent front wheel. Typically, but not necessarily, quarter panels include an inner panel 14 that in part faces the passenger compartment or cabin of the motor vehicle, and an outer panel 16 that is spaced from inner panel 14 and generally comprises the outside portion or skin of the quarter panel. Other locations exist in a motor vehicle wherein there are two panels or other members that define an empty volume such as volume 20 between them, where such volume is capable of being fluidly coupled to the passenger compartment. Other volumes could be used that are not between body panels, such as those detailed above. In this example there is an opening 11 in interior body panel 14, where opening 11 fluidly connects with (i.e., is acoustically coupled to) interior or cabin 26 of a motor vehicle passenger compartment (not shown).

Expandable molding tool 10 is partially or fully placed within empty volume 20 between body panels 14 and 16. When it is placed into volume 20, tool 10 occupies less volume than when it is in its expanded state. Tool 10 may have a free state wherein it occupies a particular volume, without any force applied to it. The tool may potentially be collapsible from the free state such that it occupies less volume. The tool can be collapsed before it is inserted into volume 20. Or, the tool can be inserted in its free state, or even in a partially expanded state. In most cases, the tool is inserted into volume 20 in its free state. Tool 10 is able to be expanded to a larger volume. As described above, alternatively the tool is not expandable, in which case it can be placed into the cavity in its normal, free state.

Expandable molding tool 10 comprises a solid barrier that divides space 20 into interior portion 12 on the inside of tool 10, and exterior portion 13 that is external to the outside of molding tool 10 where the outside of molding tool 10 is exposed to the space 20 between body panels 14 and 16. Expandable molding tool 10 thus in part divides volume 20 into interior volume portion 12 and exterior volume portion 13. Expandable molding tool 10 is constructed and arranged to be expanded such that the volume 12 increases and volume 13 decreases. The construction of tool 10 and the manner in which it is expanded and contracted can be selected as desired, with non-limiting examples described herein. Conceptually, as depicted in FIG. 1B, tool 10 is expanded such that its sidewalls 22 move away from opening 11 and/or its end wall 24 moves closer to body panel 16. The expansion is effective to increase interior volume 12 and decrease exterior volume 13. The shape of the tool is established such that when expanded it occupies a volume that is sufficient to act as an acoustic enclosure.

Once tool 10 has been expanded, a fluid material is introduced into exterior space 20. The fluid material is configured to cure into a solid shell. The fluid material can be an expandable material that expands in situ after it has been introduced into space 20. Or the material can be a non-expanding material. The fluid material is arranged to cure in situ into a shell. The shell is preferably but not necessarily sealed, and air-impervious. FIG. 1C schematically depicts this aspect of the method, wherein conduit 30 is used to supply expandable fluid material 38 into space 13 and in contact with the outside of tool 10. Material 38 expands and cures to form solid shell 40 which surrounds some or all of the portion of tool 10 that is located within the volume 20. Generally, the tool 10 is designed such that in its expanded state there is free space around the entire periphery of the tool 10 that is located in the volume 20, and the expandable fluid material 38 is supplied (and constrained as necessary) such that the resulting solid shell 40 surrounds all of the expanded molding tool 10 that is in the space between body panels. One reason to use an expandable fluid material is so that it can fill the cavity on the outside of the tool, but as explained below this is not a limitation of the disclosure. Expandable fluid material can also be arranged to expand fast enough, along with curing of the leading edge of the expanding foam, such that it is effective to seal holes and gaps in or between the adjacent members of the motor vehicle. Molding tool 10 in some circumstances is then collapsed and withdrawn through opening 11 to leave a cavity 12 that is fully or partially located between the body panels 14, 16 and is open to passenger compartment (cabin) interior 26. In other circumstances (further described below) molding tool 10 can be left in place, in which case it may form part of the shell that defines acoustic enclosure 12.

Figure 2A:
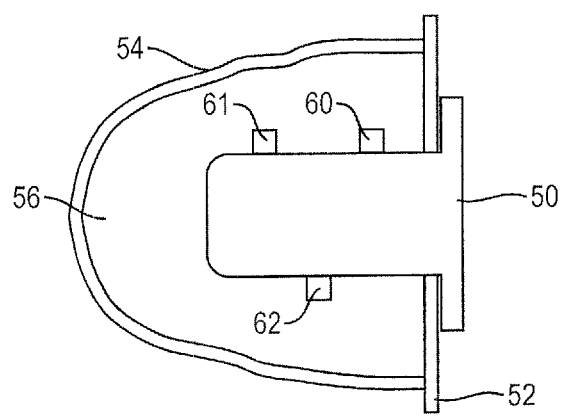
FIG. 2A is schematic cross-sectional view of an expandable molding tool in the space between two body panels of a motor vehicle.
Figure 2B:
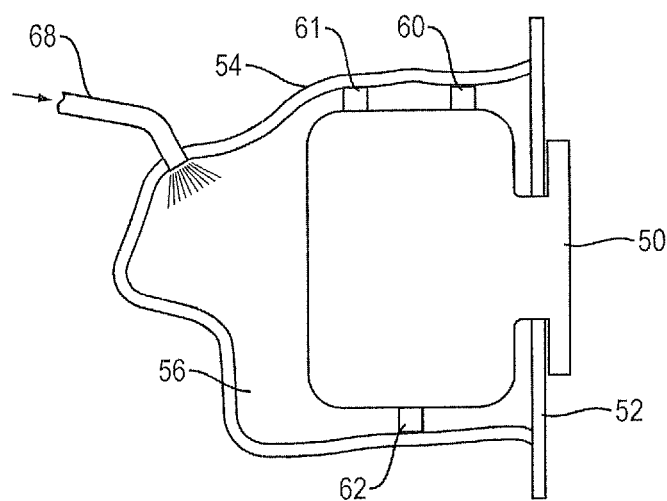
FIG. 2B shows the tool of FIG. 2A expanded.

In some cases the body panels or other structures of the motor vehicle between which the acoustic enclosure is created in accordance with the present disclosure define a non-uniform volume in which the acoustic enclosure will be created. Such non-uniformity is schematically depicted in FIGS. 2A and 2B wherein body panels 52 and 54 define irregular empty volume 56 between them. In some cases, once expandable molding tool 50 is placed into volume 56 the remainder of volume 56 outside of tool 50 is essentially fully enclosed by structural members of the motor vehicle, but may not be air tight. One issue this presents is that many expandable fluid materials need to expand under some back pressure in order to be held in place as they cure and harden. Examples of expandable fluid materials that can be used herein include but are not limited to highly expanding polymer-based foams such as Betafoam™ from the Dow Chemical Company, which is a highly expanding foam that is approved in the US for use in motor vehicles. Other plastic foams or other fluid materials that cure and harden could be used, for example one or two-part expanding polyurethane foams such as TAP X-30 from TAP Plastics Company and Great Stuff Pro from Dow Building Solutions.

In one example the expandable fluid material expands and hardens into a closed cell foam. A closed cell foam structure can be airtight without the need for other components such as a skin. Also, the closed cells prevent air infiltration into the material making up the shell; air infiltration could alter the volume of the acoustic enclosure and thus change its acoustic properties, which is undesirable. Alternatively the material could be an open cell foam in which case the material is not airtight. An acoustic enclosure shell made from material that is not airtight can be made airtight in other manners. For example, an air-impervious skin can be located on the outside and/or inside of the shell so that the resulting acoustic enclosure is air tight.

Tool 50 in this non-limiting example has one or more mechanical stops or standoffs on its outside surface. Standoffs 60, 61 and 62 are located on the outside of tool 50. When tool 50 is expanded, the stops contact body panel 54 so as to define an end position of the expanded tool. Mechanical stops or other manners to define the expanded state of the molding tool can be useful means of accomplishing a repeatable shape and volume of the resulting acoustic enclosure, which can be an important aspect in production motor vehicle manufacturing. It is believed that the volume from one motor vehicle to the next of the resulting acoustic enclosure should end up with no more than about a +/−10% differential from the design volume in order to achieve an acoustic enclosure or cavity that has sufficiently similar acoustic properties such that the performance of the audio system using the acoustic enclosure does not suffer to an unacceptable degree.

As shown in FIG. 2B, when tool 50 has been fully expanded to the point where stops 60-62 contact body panel 54, the expandable fluid material is introduced into external cavity 56. The introduction of expandable fluid material is schematically illustrated in this drawing by conduit or hose 68 through which the expandable fluid material is conducted or sprayed. In this example, desirably but not necessarily the entire volume 56 is filled with the cured expanded material. The cured fluid material should properly release from the tool. This can be accomplished by selection of the fluid material and/or proper treatment of the outer surface of the tool.

The acoustic enclosure created according to this disclosure is typically used as part of the motor vehicle audio system. One non-limiting example of the use of the acoustic enclosure is as the rear loudspeaker cavity for a bass box for the vehicle. Bass boxes for motor vehicles desirably have a volume in the range of about 6 to 8 liters but can be smaller or larger (e.g., the acoustic enclosure may have a volume between about 4 liters and about 12 liters). Bass boxes are typically tuned to from about 35 Hz to about 50 Hz. The tuning of the box is a combination of port length, port cross sectional area and the box volume. Box volume impacts total output more than changing the port tuning does. This is one reason that the volume of the acoustic enclosure should ideally be held to about ±10% of design volume from motor vehicle to motor vehicle. The cavity between the inner and outer body panels of the front quarter panels of passenger cars and some other motor vehicles is highly variable from one vehicle model to the next. Most times the space or volume is very non-uniform but often has a volume of 12 liters or more. Thus an acoustic enclosure for an effective bass box can be created in the interior of front quarter panels of many passenger cars.

Figure 3A:
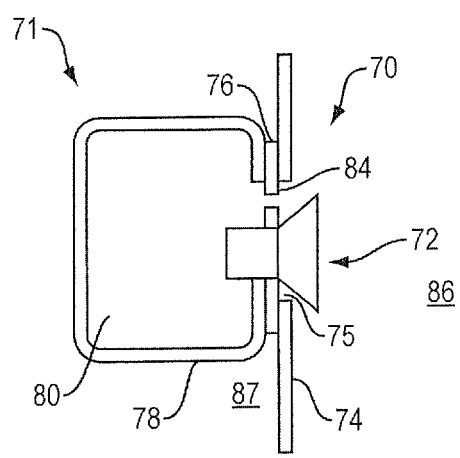
FIG. 3A is a schematic cross-sectional view of an acoustic enclosure and loudspeaker.
Figure 3B:
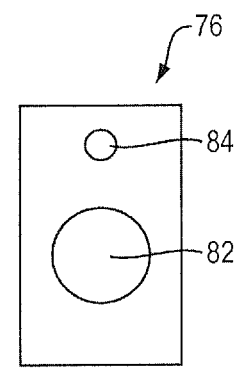
FIG. 3B is a front view of the loudspeaker mounting plate of FIG. 3A.

A bass box or other acoustic enclosure generally comprises a loudspeaker mounted such that its front radiating surface is fluidly coupled to the cabin of the motor vehicle while its rear surface is acoustically (i.e., fluidly) coupled to the acoustic enclosure formed in accordance with the present disclosure. An example is shown in FIGS. 3A and 3B wherein bass box assembly 70 comprises acoustic enclosure 71 that comprises solid shell 78 that has an interior volume; acoustic enclosure 71 can be created in a manner such as described herein. Speaker mounting plate 76 in this example is located spanning opening 75 in inner body panel 74. Mounting plate 76 can be on the inside or the outside of body panel 74. Mounting plate 76 has opening 82 in which loudspeaker 72 is mounted; opening 82 can be round, or a different shape depending on the speaker that is used. Mounting plate 76 may also have but need not have opening 84 that acts as a port, or as the opening of a port, that fluidly interconnects interior volume 80 with the vehicle cabin 86. Ported bass boxes are known in the art, and porting and other constructional aspects of such bass boxes need not be further described herein.

In this case, interior portion 80 of acoustic enclosure 71 is airtight to volume 87 that is external to where the molding tool was located (i.e., external to shell 78), but is not airtight to the passenger compartment 86 due to opening 84. A bass box herein may be closed (i.e., sealed), or it may have a small air leak (e.g., with what are termed "loss elements"), or it may be ported, or it may have one or more passive radiators, as is known in the art. Interior volume 80 can be relatively regular as shown in FIG. 3A, or can have a more irregular or complex shape. Volume 80 can comprise two or more connected smaller volumes, as long as the connecting portions do not act as ports or otherwise have a deleterious effect on the acoustic performance of the volume. Without being held to any particular value, it is generally believed that any connecting portions should have a cross-sectional area of at least about 4,000 mm$^2$; below this the narrowed neck connecting portion can impact the acoustic performance of a bass box rear enclosure.

Figure 4:
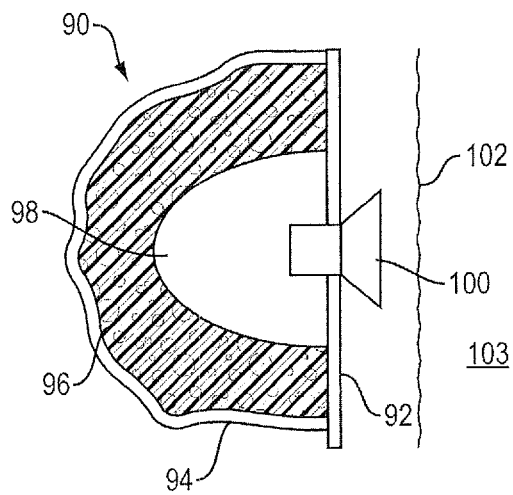
FIG. 4 is a schematic cross-sectional view of a bass box.

Bass box assembly 90, FIG. 4, comprises interior body panel 92 that faces motor vehicle cabin 103. Bass loudspeaker 100 is mounted in panel 92. Second body panel 94 forms the outer extent of assembly 90. Solid shell 96 comprising expanded polymer foam material is located inside of body panel 94 and fully surrounding interior space or acoustic enclosure 98 to which the rear of loudspeaker 100 is acoustically coupled. Decorative lining 102 may be located on the outside of body panel 92. Lining 102 can be part of the interior motor vehicle trim. It can be acoustically transparent but aesthetically pleasing. In another non-limiting example there can be a small volume of air and a second port on the front side of the speaker.

Figure 5:
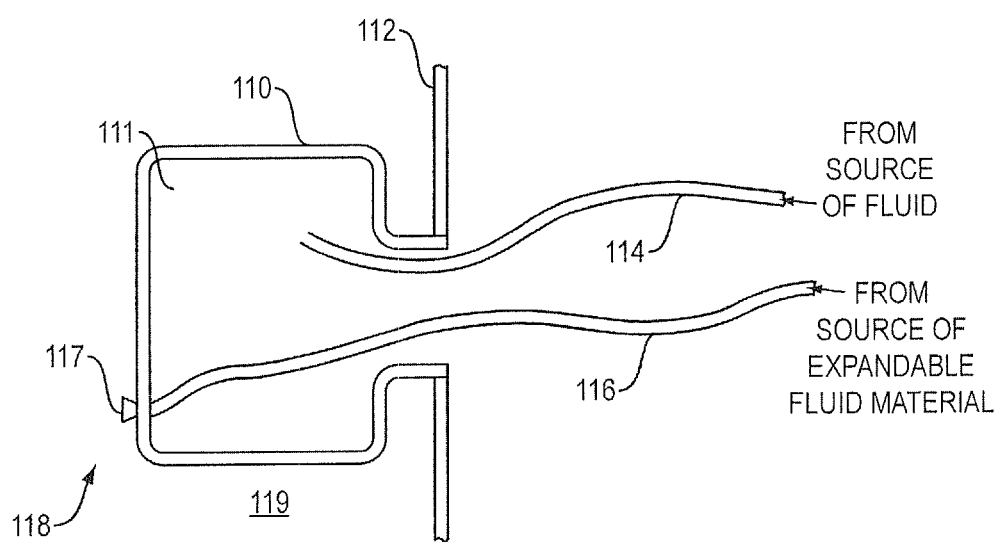
FIG. 5 schematically illustrates molding tool expansion and injection of expandable material on the outside of the tool.

FIG. 5 depicts in one drawing two alternatives which may or may not both be used in a single method herein. In this example, expandable molding tool 110 is located on the outside of interior quarter panel member 112 and defines interior space 111 within tool 110. Tool 110 is constructed and arranged to be expanded. The expansion of an expandable tool typically is accomplished either with a fluid or by some mechanical means. In this example line 114 is used to convey fluid to and from the tool so as to expand the tool. The fluid may be air, or may be a liquid, for example. Volumetric expansion of expandable tools using a fluid such as a liquid or gas is known in the art and is not described in particularity herein. Mechanical expansion of tool 110 is also contemplated herein, e.g., using ratchets, cams or other mechanisms known in the art that can expand (and, usually, collapse) a tool that has a solid wall and defines an empty interior volume. Also depicted is a second line 116 which also carries fluid material, but in this case carries the expandable fluid material that is placed into the cavity outside of tool 110. The drawing depicts line 116 passing through the interior 111 of tool 110 with an end 117 located in exterior volume 119. This arrangement allows both sources of fluid to be located on one side of tool 110, as opposed to the arrangement FIG. 2B in which the expandable fluid is provided from the outside of the tool. Both of these locations for delivery of expandable fluid material are considered to be within the scope of the present disclosure.

Figure 6:
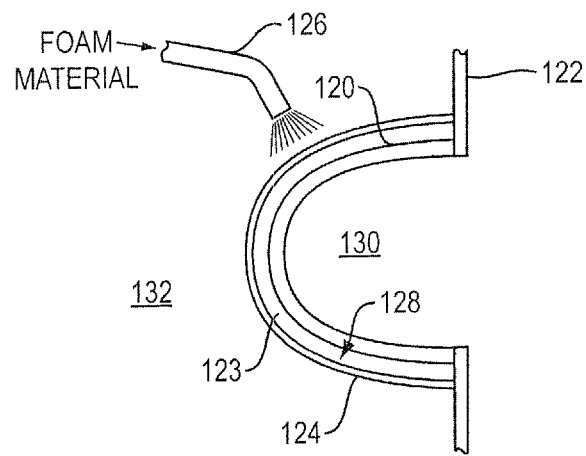
FIG. 6 is a schematic cross-sectional view of an expandable molding tool with a skin on its outside.

FIG. 6 depicts in one drawing two alternatives which likely would not both be used in a single method herein. In this example expandable molding tool 120 is located in volume 132 outside of inner body panel 122. Tool 120 defines interior portion or volume 130 that is separated from volume 132 by a solid barrier. In this case an external skin 124 is placed on the outside of tool 120. Skin 124 can lie tightly against the outside of tool 120 or skin 124 can be spaced from tool 120 to define intermediate volume 123. In one example, foam material 128 may be injected into volume 123 to form the solid shell. Skin 124 could one example be flexible and expandable (like a balloon), in which case it acts to constrain and put necessary or desirable back pressure on the expandable fluid material that is injected into volume 123.

It may alternatively be possible to use a balloon 124 as the expandable molding tool (in other words, without tool 120), where the balloon becomes the outer skin of the resulting hardened shell. Or, an expandable "balloon" or envelope may be expanded and then frozen in its expanded shape. It may be possible to use the balloon or envelope as the shell; in other words, with a balloon that is air tight and sufficiently robust there may be no need to use the fluid material outside of or inside of the balloon. One type of material that may be used as a tool, or as a freeze-in-place shell (either expanding or not expanding), is "cure in place" material that has a flexible uncured liner impregnated with a UV-cured resin; such material is presently used for cure in place pipe. Cure in place material could be placed into the volume and manipulated or expanded to its final shape, then cured with UV light to form a solid shell which is preferably but not necessarily air impervious.

In another example a thermoplastic sheet may be used as the tool or the skin or the envelope. The plastic sheet may be softened in place and expanded (e.g., using hot air, or an expanding mechanical tool). A pressure valve could be used to prevent the stretching plastic from over inflating. Once the tool was expanded the blown hot air could be stopped so that the plastic would cool and harden. Or the air could be reversed to create a vacuum and the tool could be cooled to re-solidify the plastic in its shape. If an expansion tool was used it could then be collapsed and withdrawn, leaving the hardened plastic envelop as the shell, or as a skin on the shell.

In another example, skin 124 may be more rigid and airtight to define a particular (fixed) volume 123 that is filled with the fluid material that hardens to create the shell. Another alternative is to provide expandable foam material 126 on the outside of skin 124. In this case once tool 120 is collapsed and removed, skin 124 will define the interior of the resulting solid shell. If skin 124 is air impervious, this procedure allows material 126 to be an open celled foam or another fluid material (e.g., a molten material that hardens) that is not itself air impervious, while still creating an air impervious solid shell for the acoustic enclosure. Also, an inside skin can prevent the fluid material from sticking to the tool. There can be no skin, a skin on the inside of the shell, a skin on the outside of the shell, or skins on the inside and outside of the shell.

Figure 7:
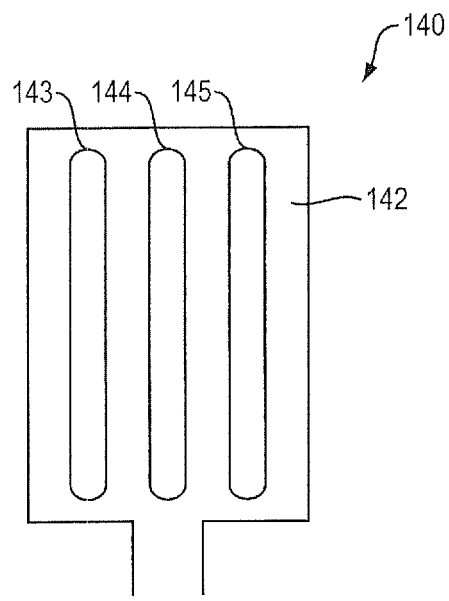
FIG. 7 is a schematic view of a reinforced expandable molding tool.

A simplified example of an expandable molding tool 140 is depicted in FIG. 7. Tool 140 comprises soft polymer body 142 that can be made from a material such as silicone or another material that can be repeatedly expanded and contracted. Ideally tool 140 is constructed and arranged to be used over and over again in an assembly line where motor vehicles are assembled. If the material of body 142 does not have sufficient strength or rigidity, or it in and of itself is not able to properly define the necessary size, shape and volume of the acoustic enclosure, one or more stiffening or strengthening members such as members 143-145 (e.g., stiff metal or plastic inserts or ribs) may be embedded within body 142 and/or located on the inner and/or outer surface of body 142. Members such as members 143-145 can strengthen the tool and/or help define a particular expanded shape and volume.

A number of implementations have been described. Nevertheless, it will be understood that additional modifications may be made without departing from the scope of the inventive concepts described herein, and, accordingly, other embodiments are within the scope of the following claims.

What is claimed is:

1. A method of creating in situ an acoustic enclosure in a space that is between body panels of a motor vehicle, wherein the space defines an empty volume, the method comprising:
    placing into the space between body panels a molding tool that comprises a flexible envelope with an inside and an outside, where the flexible envelope acts as a solid barrier that divides the space between body panels into an interior portion within the inside of the molding tool and an exterior portion that is external to the outside of the molding tool, where the outside of the molding tool is exposed to the space between body panels, wherein the flexible envelope is expandable, and is adapted to be expanded from a first state where the molding tool occupies a first volume, to an expanded state where the molding tool occupies a second volume that is greater than the first volume, and wherein the second volume is less than the empty volume of the space between body panels;
    providing a mechanical stop located between the flexible envelope and one or more of the body panels, where the stop at least in part defines the expanded state of the flexible envelope;
    expanding the flexible envelope from the first state to the expanded state; and then
    while the molding tool is in the space between the body panels with the flexible envelope in the expanded state, introducing a fluid material into the exterior portion of the space between the body panels, wherein the fluid material is configured to cure into a solid shell that is in direct contact with the outside of the molding tool.

2. The method of claim 1 wherein the shell is in direct contact with all of the outside of the molding tool that is in the space between body panels.

3. The method of claim 1 wherein the motor vehicle has a vehicle cabin, and the interior portion of the space between body panels is in fluid communication with the vehicle cabin.

4. The method of claim 3 wherein the body panels comprise interior and exterior front quarter panels, and there is an opening in the interior panel that is in fluid communication with the vehicle cabin, wherein the molding tool is placed into the space between body panels through the opening in the interior panel.

5. The method of claim 1 wherein the fluid material is introduced directly into the exterior portion of the space between body panels.

6. The method of claim 1 wherein the fluid material passes through the inside of the flexible envelope before the fluid material is introduced into the exterior portion of the space between body panels.

7. The method of claim 1 wherein the flexible envelope comprises a soft polymer.

8. The method of claim 7 wherein the molding tool further comprises a plurality of stiffening members embedded in the soft polymer.

9. The method of claim 1 wherein the flexible envelope is expanded with at least one of a fluid and mechanically.

10. The method of claim 1 wherein the stop comprises one or more standoffs on the outside of the flexible envelope, where the standoffs are configured to contact one or more of the body panels when the flexible envelope is in the expanded state.

11. The method of claim 1 wherein the fluid material comprises a closed-cell foam, and wherein the shell is air tight.

12. The method of claim 1 wherein the shell comprises an external air-impervious skin.

13. The method of claim 1 further comprising placing a skin over the outside of the molding tool before the molding tool is placed into the space between the body panels.

14. The method of claim 13 wherein the skin is on the inside of the shell.

15. The method of claim 14 wherein the skin is air impervious.

16. The method of claim 15 wherein the fluid material comprises an expandable open-celled or closed cell foam.

17. The method of claim 13 wherein the skin is on the outside of the shell.

18. The method of claim 17 wherein the fluid material is introduced between the skin and the outside of the molding tool.

19. The method of claim 1 wherein the molding tool comprises an expandable skin.

20. The method of claim 1 wherein the flexible envelope is contracted before it is placed into the space between body panels.

21. The method of claim 1 wherein the interior of the shell defines an acoustic volume that is constructed and arranged to be located directly to the rear of a loudspeaker.

22. The method of claim 21 wherein the acoustic volume has no location with a cross-sectional area of less than about 4000 $mm^2$.

23. The method of claim 21 wherein the acoustic volume is from about 4 liters to about 12 liters.

24. The method of claim 1 wherein the fluid material comprises an expanding closed-cell foam.

* * * * *